United States Patent [19]

Mooney, Jr.

[11] 4,095,222

[45] June 13, 1978

[54] POST-DETECTION STC IN A MEDIUM PRF PULSE DOPPLER RADAR

[75] Inventor: David H. Mooney, Jr., Arnold, Md.

[73] Assignee: Westinghouse Electric Corp., Pittsburgh, Pa.

[21] Appl. No.: 690,754

[22] Filed: May 27, 1976

Related U.S. Application Data

[63] Continuation-in-part of Ser. No. 665,138, Mar. 8, 1976, abandoned.

[51] Int. Cl.² ............... G01S 7/28; G01S 9/02; G01S 9/42
[52] U.S. Cl. ............... 343/7 A; 343/5 SM; 343/7.7; 343/17.1 PF
[58] Field of Search ............ 343/100 LE, 5 SM, 7.7, 343/17.1 PF, 7 A

[56] References Cited

U.S. PATENT DOCUMENTS

| | | | |
|---|---|---|---|
| 3,094,695 | 6/1963 | Jahn | 343/100 LE X |
| 3,349,402 | 10/1967 | Foster | 343/100 LE X |
| 3,659,290 | 4/1972 | Bourque | 343/5 SM |
| 3,765,020 | 10/1973 | Seager et al. | 343/5 SM |
| 3,787,848 | 1/1974 | Laundry | 343/7.7 |
| 3,831,174 | 8/1974 | Kany et al. | 343/7 A |
| 3,860,924 | 1/1975 | Evans | 343/7.7 |
| 3,943,511 | 3/1976 | Evans et al. | 343/7 A |
| 3,949,398 | 4/1976 | Donahue | 343/5 SM X |
| 3,955,196 | 5/1976 | Nirasawa et al. | 343/7 A X |

Primary Examiner—Malcolm F. Hubler
Attorney, Agent, or Firm—H. W. Patterson

[57] ABSTRACT

A method and apparatus is described for the post processing of return signal data in a single channel medium PRF pulse doppler radar receiver. The disclosure is directed to preventing sidelobe return signals from being displayed as "ghost" or "false" targets. The received signal data is preliminarily processed by a filter bank and a CFAR threshold circuit to remove main beam clutter and area sidelobe clutter returns. The preliminarily processed data is then temporarily stored as two parallel correlations are performed on a range cell by range cell basis to identify range cells which contain discrete sidelobe clutter return signals. One of the parallel correlations is performed on the data after it has passed an STC (Sensitivity Time Control) threshold circuit and the other parallel correlation is performed on the raw data. The outputs of the parallel correlators are compared. The identified range cell correlations in the raw data correlator are compared with corresponding range cells of the STC's correlations to identify range cell numbers which contain discrete sidelobe clutter return signals. Identified range cell numbers are blanked from the raw data before it is correlated for a third time. The output of the third correlator identifies the true target return signals and the corresponding unambiguous range thereof.

15 Claims, 6 Drawing Figures

POST-DETECTION STC IN A MEDIUM PRF PULSE DOPPLER RADAR

CROSS REFERENCES TO RELATED APPLICATIONS

The present application is a continuation-in-part of the copending, U.S. Pat. application, "Post-Detection STC in a Medium PRF Pulse Doppler Radar," Ser. No. 665,138, filed Mar. 8, 1976 by David H. Mooney, Jr., now abandoned, who is also the inventor of the present application.

BACKGROUND OF THE INVENTION

1. Field of the Invention

The present invention is directed to an improved system for post-detection processing of information in radar receivers.

2. State of the Prior Art

In medium PRF radar systems employing multiple PRF's, "ghost" or "false" target indications often appear where very strong "discrete" sidelobe clutter return signals correlate with true target return signals occurring in corresponding ambiguous range gates of the multiple PRF's. In the prior art, the problem of distinguishing true target returns from discrete clutter returns in corresponding ambiguous range gates has been approached with significantly diverse systems.

Generally, a medium PRF pulse doppler (PD) type radar is characterized by having an ambiguous range measurement, for each received pulse. By contrast, in a low PRF system, the time period between each transmitted pulse allows time for the transmitted pulse to be reflected from a within-range target and to be received by the receiver before the next pulse is transmitted. Therefore, in a low PRF system, the range of each return signal is unambiguous since the time between the transmitted pulse and the corresponding received signal is known. However, in a medium PRF system, the transmitter transmits a pulse, and prior to the pulse having time to be returned by a within-range target, subsequent pulses are transmitted. The interpulse period (time between each transmitted pulse) in the medium PRF system is shorter than that for the low PRF system. As a result, pulses received by the radar receiver in a medium PRF system are ambiguous in range, since the return signal may occur in one of a plurality of interpulse periods subsequent to the period immediately following the corresponding transmitted pulse.

In medium PRF radar systems, each transmitted pulse is coherent with respect to every other transmitted pulse, and the Pulse Repetition Frequency is high enough to monitor high or low speed doppler shifts in the return signals. Used in a high speed aircraft environment, such doppler shift information may be used to determine the speed, acceleration and direction of motion of a moving target. The presence of doppler shift in the return signals also provides a basis for distinguishing true targets from main beam (stationary) clutter signals returned through the main beam of a directional antenna. However, since the true target returns occur in ambiguous range gates, it is quite possible and highly probable that close-in return signals from discrete ground clutter may be picked up in the sidelobes of the directional antenna and will occur in corresponding ambiguous range cells. Subsequent resolving of the inherent ambiguous range into the unambiguous range for each signal will result in many false targets appearing at widely different ranges.

Figure 1A:
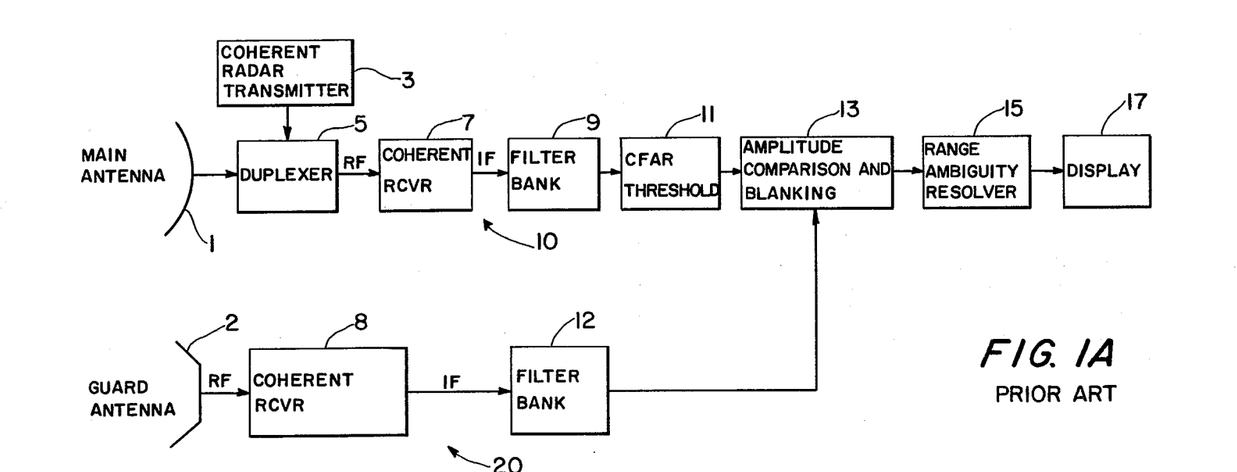
FIG. 1A is a block diagram of a prior art radar receiver employing guard channel blanking techniques.
Figure 1B:
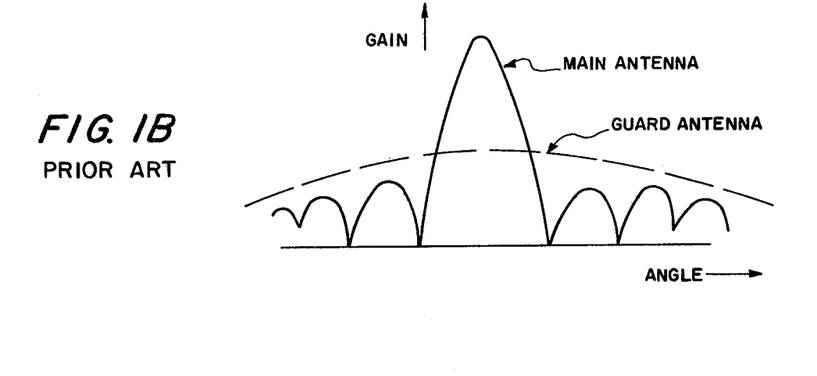
FIG. 1B is a graphic representation of the gain characteristics of a directional main beam antenna as compared with a broad beam guard antenna employed in the prior art.

In a typical prior art radar receiver, as shown in FIG. 1A, also discussed in commonly assigned U.S. application Ser. No. 665,348, entitled TARGET DETECTION SYSTEM IN A MEDIUM PRF PULSE DOPPLER SEARCH/TRACK RADAR RECEIVER, two separate receiver channels, 10 and 20 are used in order to distinguish true target return signals from main beam clutter and discrete sidelobe clutter in a medium PRF system. A directional main antenna 1 is connected through a duplexer 5 to the main channel coherent receiver 7. The directional main antenna 1 is characterized by having a high gain directional main beam reception response and a low gain sidelobe reception response, as is comparatively shown in FIG. 1B. A separate guard receiver channel 20 includes a guard antenna 2 connected to a coherent receiver 8. The guard antenna is separate from the main antenna and, as shown in FIG. 1B, has a characteristic broad beam gain response which is comparatively higher than any sidelobe of the main antenna 1 and is comparatively lower than the main beam of the main antenna 1. The guard channel 20 will necessarily receive the same signal information as is received in the main channel 10. However, due to the reception characteristics of the respective main antenna, signals received in the main beam of the main antenna 1 are output with a higher amplitude than are corresponding signals received in the guard antenna 2. Correspondingly, return signals received in the main antenna sidelobes are output with a lower amplitude than the corresponding signals received by the guard antenna. Typically, the main channel 10 and the guard channel 20 contain filter banks 9 and 12, respectively. These filter banks are effective in acting as main beam clutter rejectors by filtering the output of the corresponding coherent receiver 7 and 8, and rejecting signals which are doppler shifted by an amount corresponding to the stationary ground targets in the main beam (main beam clutter) with respect to the speed of the radar-carrying aircraft. Since the main beam clutter has a predictable doppler shift, determined by the speed of the radar-carrying aircraft with respect to the stationary targets in the main beam, only signals which are doppler shifted away from the main beam clutter frequency are passed through the filter banks in each channel. The signals which are passed by the filter banks in each channel, may include both area and discrete sidelobe return signals, main beam target return signals from targets moving with respect to main beam clutter and noise, since both discrete sidelobe return signals and moving target return signals in the main beam have dopplers which are shifted away from the predicted doppler shift of the main beam clutter.

The signals passed by the filter bank 9 in the main channel 10 are fed into a conventional constant false alarm rate (CFAR) threshold circuit 11. The CFAR threshold circuit has an adaptive threshold level which raises or lowers to block out area sidelobe clutter, but is ineffective against strong discrete sidelobe clutter signals.

As discussed previously, due to the antenna characteristics, the guard channel 20 receives the sidelobe clutter with a higher amplitude than does the main channel 10. On that principal, the prior art embodiment shown in FIG. 1A, operates so that the detection of the sidelobe clutter in the guard channel 20 is used to cancel or blank out the correspondingly detected clutter which occurs in the sidelobes of the main antenna 1 and is amplified in the main channel 10.

The output of the guard channel 20 is fed into the amplitude comparison and blanking circuit 13, wherein the amplitudes of the discrete doppler shifted signals, corresponding in frequency, are compared. Where the amplitude of a discrete frequency guard channel signal exceeds the corresponding signal amplitude in the main channel, that discrete frequency is blanked from further processing. Since the guard channel 20 normally receives the true target returns at an amplitude far reduced than that of the main channel, the effect of the guard channel is to cause cancellation of only the discrete sidelobe clutter returns without effecting the true target returns received in the main channel 10.

Following the blanking operation, the range ambiguity resolver 15 receives the true target signals, which are ambiguous in range, and resolves the range. If a plurality of PRF's are transmitted, the receiver 15 divides the PRF's into a predetermined number of range cells and correlates the reception in corresponding range cells of each PRF. The signals which occupy corresponding range cells in each of the other PRF's are correlated, and the true target return signal is determined when it appears in a range cell common to each of a predetermined number of PRF's. The principles of this technique are described, for example, in THE RADAR HANDBOOK, McGraw-Hill 1970, pages 19-13 through 19-17, as well as "Multiple High PRF Ranging" by W. A. Skillman and D. H. Mooney, Proceedings of the 1960 IRE Conference on Military Electronics, pages 37-40. The above prior art system thereby resolves the range ambiguity and distinguishes true targets from sidelobe clutter. The target is then displayed in a conventional manner on a PPI display, according to the resolved unambiguous range measurement.

Problems with the prior art guard channel receiver system as described above, and shown in FIGS. 1A and 1B, are manifest, due to the redundancy necessitated by the guard channel circuitry and guard channel antenna mechanism. Such redundancy is detrimental, since it is expensive and also adds additional weight to the aircraft.

Attempts to eliminate the above technique have produced other prior art attempts to eliminate sidelobe discrete clutter. One of those techniques involves the use of an ultra-low sidelobe antenna so that sidelobe clutter discrete returns are not detected, to thereby reduce the occurrence of "ghost" target indications. Such an ultra-low sidelobe antenna used in a radar system on a modern high speed aircraft, appears to work well at higher altitudes, but is not effective in "on-the-deck" operations where discrete sidelobe clutter returns are high and are necessarily received, due to the close proximity of the aircraft to the discrete clutter targets.

Figure 2:
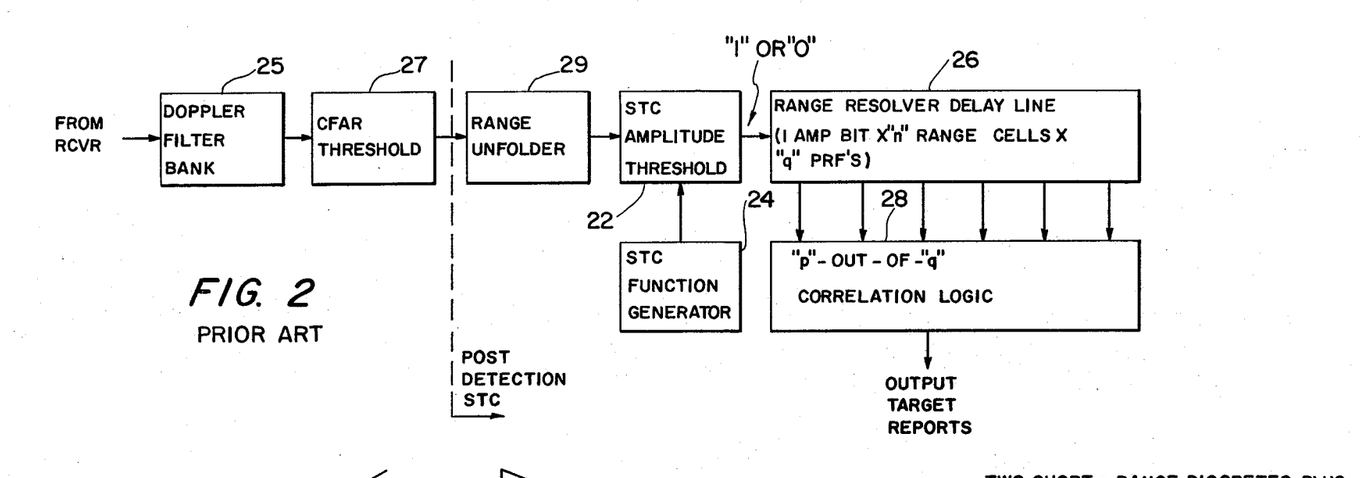
FIG. 2 is a block diagram of a prior art section of a single channel radar receiver with post detection-STC processing.

Another prior art attempt at solving the problems described in connection with the guard channel radar receiver as typically described with respect to FIGS. 1A and 1B is the single channel radar receiver post detection-STC system shown in FIG. 2. The prior art system in FIG. 2 has the advantage of a single channel receiver, thereby eliminating the guard channel and the corresponding redundant hardware necessitated thereby. The prior art system shown in FIG. 2 also eliminates the costly use of the relatively expensive ultra-low sidelobe antenna, since it may be used with a more conventional directional antenna similar to that shown in FIG. 1 as main antenna 1. FIG. 2 shows a post detection system which operates in conjunction with a receiver similar to that shown as the main channel 10 in FIG. 1, wherein the received signals from the coherent receiver are received by a conventional doppler filter bank 24. The doppler filter bank 25 rejects those signals which are doppler shifted by a predetermined amount corresponding to main beam ground clutter. The remaining signals are passed by the doppler filter bank 25 to a conventional CFAR threshold circuit 27. As described previously, the CFAR threshold circuit typically has an adaptive threshold level which raises or lowers to block area sidelobe clutter return signals, but is ineffective against strong discrete sidelobe clutter return signals. The use of a filter bank and a CFAR threshold circuit are well known in the art, and are typically described in U.S. Pat. No. 3,701,149.

The post detection-STC circuit shown in FIG. 2 further includes a range unfolder 29, which receives the detected data from the CFAR threshold circuit indicating received signals and their corresponding amplitudes, for each PRF. The range gate corresponding to each detected data (ambiguous) is unfolded into true range cells (unambiguous). Therefore, for example, a detection in ambiguous range gate No. 3 in a first PRF having a total of 50 gates between each transmitted pulse will result in the range unfolder circuit 29 placing the detection in cells 3, 53, 103, 153, . . ., etc.

Figure 3:
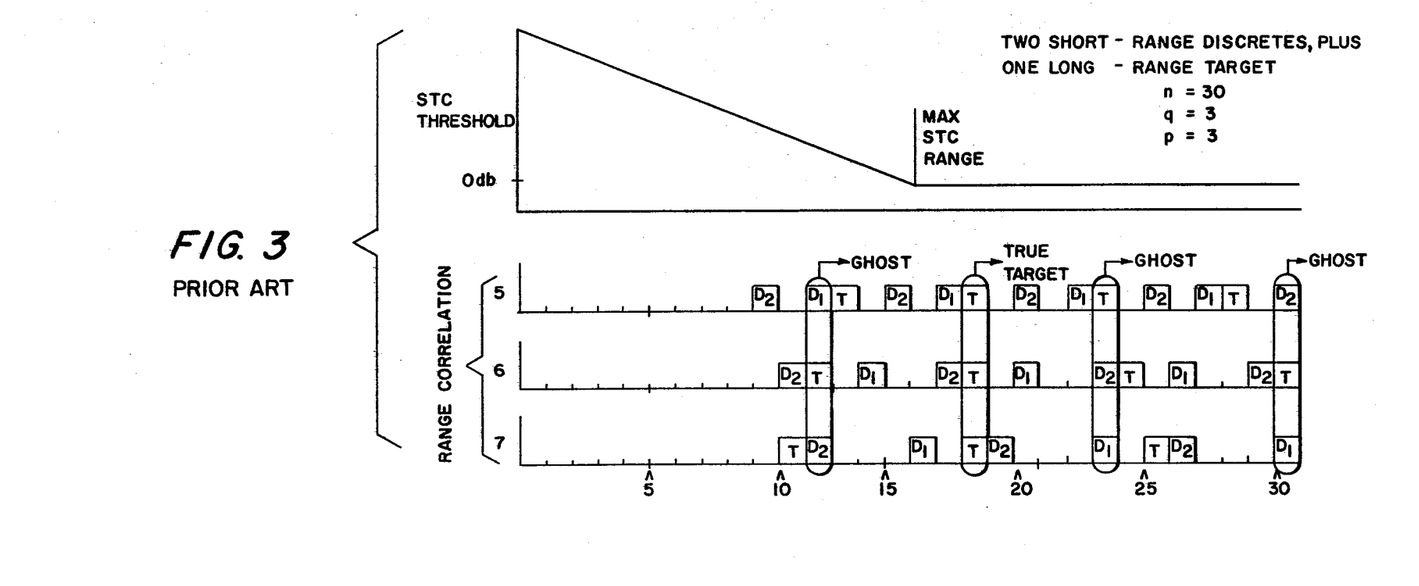
FIG. 3 is a graphic representation of data being processed through the system shown in FIG. 2.

An STC (Sensitivity Time Control) amplitude threshold circuit 22 operating under the control of the STC function generator 24, serves to compare the amplitude of the detected and unfolded data with a threshold which varies over a portion of the range of the receiver as a decaying function of an $R^4$ power curve. The range of the threshold extends to a point where discrete sidelobe return signals are predicted as being no longer effective to be mistaken as true target return signals and will be removed by the CFAR threshold circuit. The STC threshold, is also chosen with respect to the predicted amplitude of true target return signals received through the main beam. Therefore, the STC threshold operates on a prediction that over a certain range, true target return signals through the main beam will exceed the threshold and discrete sidelobe return signals will not exceed the threshold. Therefore, for example, if the detected data occurring in a range gate of a first PRF is a true target return signal, then its amplitude will exceed the STC threshold in the range gate which corresponds to the true range of the target. For further understanding of this prior art post detection-STC system, reference is made to FIG. 3, which shows a plot of the STC threshold over a predetermined number of range cells, compared with unfolded data for three PRF's having illustrative range cells of 5 ($PRF_5$), 6 ($PRF_6$) and 7 ($PRF_7$) between respective transmitted pulses. As can be seen from $PRF_5$, a true target return signal occurred in unambiguous range cells 3, 8, 13, 18, 23, 28, . . ., etc. In $PRF_6$, a true target return signal occurred in unambiguous range cells 6, 12, 18, 24, 30, . . ., etc. In $PRF_7$, a true target return signal occurred in unambiguous range cells 4, 11, 18, 25 . . ., etc. As each of the PRF's are compared with the STC threshold, only the target signals having sufficient amplitude to exceed the STC threshold, are passed with an amplitude of "1" to indicate detection. Each of the signals passed by the STC threshold circuit 22, are then received by the range resolver delay line 26 (typically a shift register). This delay line has a 1 amplitude bit (i.e., a "0" for no detection and a "1" for a detection above the STC threshold), by "n" range cells, where "n" is the total display range, by "q" sections, where "q" is the number of PRF's used in the system. Usually, 3 or more PRF's are used. Referring to FIG. 3, $PRF_5$ is shown as having true target return signals occurring in unambiguous range cells 13, 18, 23 and 28, which exceed the STC threshold. Those range cells will be occupied by "1"'s in the corresponding positions in the range resolver delay line 26. True target return signals which occur in range cells 3 and 8 of the $PRF_5$ train of signals from the range unfolder 29 are not received at the range resolver delay line 26 since their amplitudes were less than the STC threshold. Similarly, $PRF_6$ and $PRF_7$ each supply data to the range resolver delay line 26 and target return signals having amplitudes which exceed the STC threshold are indicated as "1" and occupy corresponding positions in the range resolver delay line. The correlator logic 28 receives the information stored in the range resolver delay line 26 and determines "p" out of "q" correlations in the corresponding range cell positions. Typically, "p" is two or more, but in the examples shown in FIG. 3 and for illustration, p and q are both equal to 3. In the sense used here, a correlation consists of having a "1" in the same unambiguous range cell number in at least p of the q PRF's. Simple logic gates, for example, are used to perform this operation. As shown in FIG. 3, a correlation exists in range cell 18 for each of the PRF's compared. Such a correlation indicates that a true target return signal has been received and the true range corresponds to the 18th range cell.

Problems exist in the prior art system shown in FIGS. 2 and 3, since discrete sidelobe return signals occurring in ambiguous range cells will exceed the STC threshold when the data is unfolded into unambiguous range gates and appear as false targets beyond the true range of the discrete targets. Thus, in FIG. 3, correlation outputs occur in unambiguous range cells 12, 23 and 30 even though the true range of the two discretes ($D_1$ and $D_2$) of this example are gates 2 and 5, respectively. These correlations are due to a detection from one target at one PRF correlating with that of other targets at the other PRF's. As a result, the indicated range can be grossly in error from that of any one target alone. These false targets are called "ghosts" and if not removed or prevented from occurring can result in an unusable display of information.

SUMMARY OF THE INVENTION

The present invention is directed to an improved system for post-detection in a single channel radar receiver, wherein the true target return signals are separated from the extraneous signals and "ghost" targets are eliminated. In the present invention, return signal data from the single channel medium PRF radar receiver in ambiguous range cell form is unfolded into unambiguous range cells and is simultaneously fed into two parallel correlators. The first correlator (A) receives the unfolded return signal data for each of the PRF's and produces a "1" indication for each of the numbered range cells in which correlation occurs. The second correlator (B) simultaneously receives the unfolded return signal data which is passed by an STC threshold circuit for each of the PRF's, and produces an output of "1" in those numbered range cells in which correlation occurs. The outputs of the A and B correlators are then compared on a range cell by range cell basis. On this basis, only if the A correlator produces a "1" signal and the B correlator produces a "U" signal in any corresponding numbered range cell, an unambiguous range cell number is converted to an ambiguous range cell number and that particular ambiguous range cell number is blanked in the ambiguous range cell return signal data which is fed to a third correlator (C). The blanked return signal data is unfolded into unambiguous range cells for each PRF and the C correlator compares the plurality of PRF's to determine correspondingly occupied unambiguous range cells in each PRF. The output of the C correlator indicates the reception of true target return signals and their range since the A and B correlators act to blank out the discrete sidelobe clutter signals.

It is an object of the present invention to provide an improved post-detection STC system in a radar receiver.

It is another object of the present invention to provide a radar receiver which can distinguish true target return signals from discrete sidelobe clutter return signals.

It is still a further object of the present invention to eliminate the separate guard channel system for rejecting sidelobe clutter discrete signals, shown in the prior art.

It is another object of the present invention to provide a post-detection STC system in a single channel airborne radar receiver, which is effective to eliminate discrete sidelobe return signals at low altitudes.

It is still a further object of the present invention to provide a post-detection STC processing system which eliminates ghost target correlations.

DETAILED DESCRIPTION OF THE INVENTION

In order to eliminate the possibility of receiving and displaying extraneous "ghost" targets, as is possible in the prior art system discussed above with respect to FIGS. 2 and 3, the present invention is directed to an improved post detection-STC system which "exorcises" the ghost targets.

In the post detection-STC circuitry of the present invention, the return signal data from the CFAR threshold circuit is correlated three times. The results of the first two correlations "A" and "B" are compared to determine which range cells contain data corresponding to clutter discretes. That information is used to blank the corresponding range cell of the return signal data before that return signal data is processed by a third correlator "C".

Figure 4:
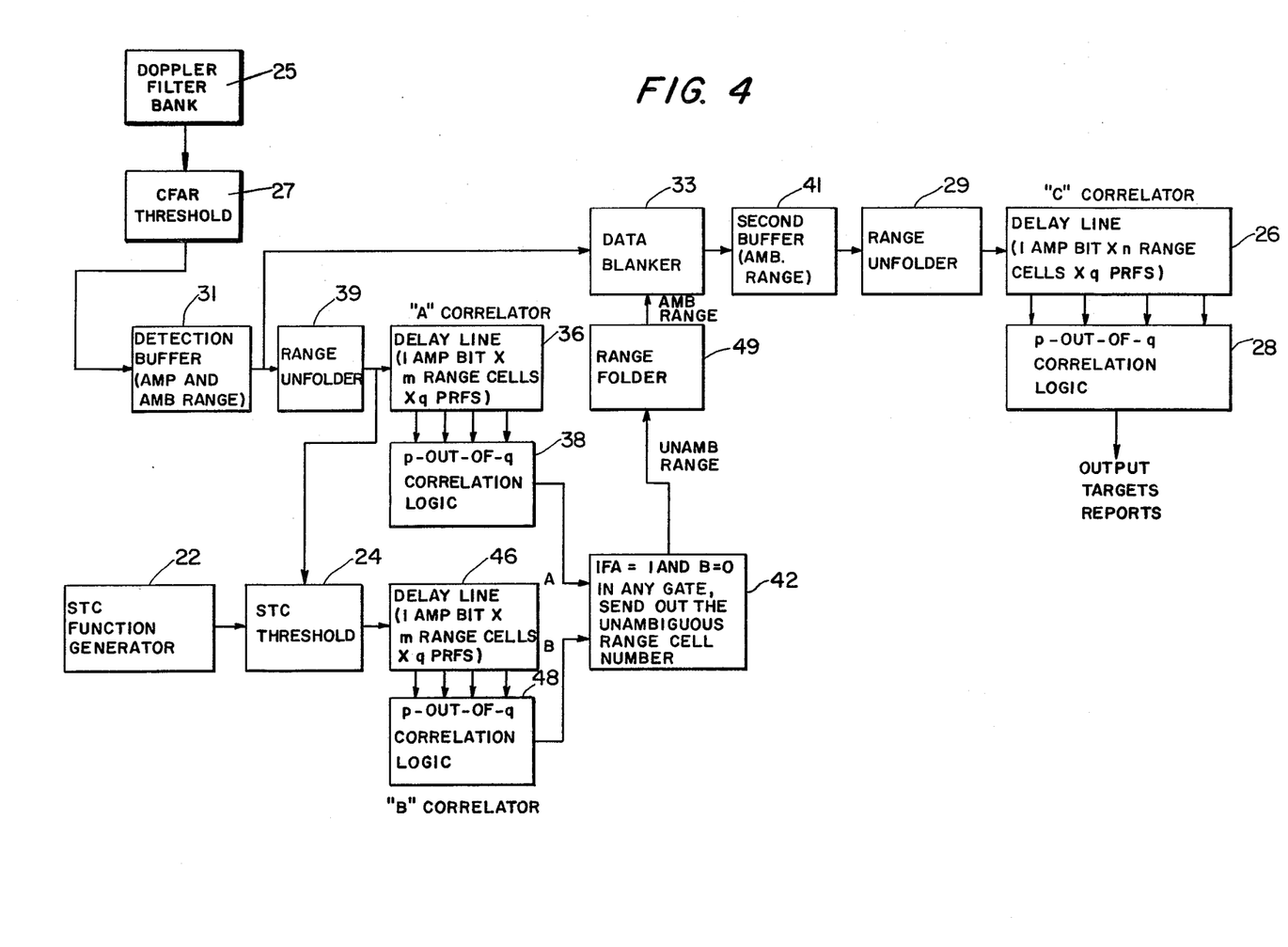
FIG. 4 is a block diagram of the post detection-STC processing system of the present invention.

As shown in FIG. 4, in a single channel medium PRF pulse doppler-type radar receiver, the signals of the coherent receiver (not shown) are applied to the doppler filter bank 25 which removes signals having the predicted doppler shift of the background of the main beam to remove main beam clutter signals from the received signals. The CFAR threshold circuit 27, which is responsive to the doppler filter bank 25, provides a constant false alarm rate threshold signal which is responsive to the level of intensity of the area sidelobe clutter. The constant false alarm rate threshold, or CFAR threshold, serves to eliminate the area sidelobe clutter returns included in the received signal. The digital information from the CFAR circuit of the receiver is received in a detection buffer 31. The information is temporarily stored in the detection buffer 31 and indicates the amplitude of the received signals and the ambiguous range cells being occupied, for each PRF.

A range unfolder circuit 39 receives the amplitude and ambiguous range data from the detection buffer 31 and, for each PRF, unfolds the data into "$m$" range cell numbers. In the preferred embodiment, the unfolding means, i.e., the range unfolder 39, is comprised of a random access memory and a modulo range counter. The random access memory and modulo range counter are commercially available devices which, for the preferred embodiment, are respectively identified as the devices 25LS00 and 25LSL63 manufactured by Advanced Micro Devices, Inc. although it will be apparent to those skilled in the pertinent art that other equivalent devices could also be used. The random access memory has at least as many addresses as the number of range cells in the ambiguous received signal of the PRF having the highest number of range cells and has for each address, a sufficient number of data bits to store the amplitude information of the ambiguous signals of each PRF. When an ambiguous PRF signal is loaded into the random access memory from the detection buffer 31, the modulo range counter accesses the number of addresses in the random access memory corresponding to the number of range cells in the ambiguous PRF signal. These addresses are accessed in repeated succession to unfold the ambiguous PRF signal over a predetermined range. By the statement that the ambiguous PRF signals are unfolded over a range, it is meant that the ambiguous PRF signals are duplicated a sufficient number of times that the chain of PRF signal duplications will extend over the predetermined range. Therefore, the length of the range determines the number of times the addresses of the random access memory are accessed for a particular ambiguous PRF signal. The length of the predetermined range, which is the STC range, is established by the range at which the amplitude of the discrete sidelobe clutter returns are statistically predicted to fall below the detection threshold level of the CFAR threshold circuit 27. Therefore, discrete sidelobe clutter return signals and true target return signals are output from the range unfolder 39 and assigned unambiguous range cells with amplitude designations.

Figure 5:
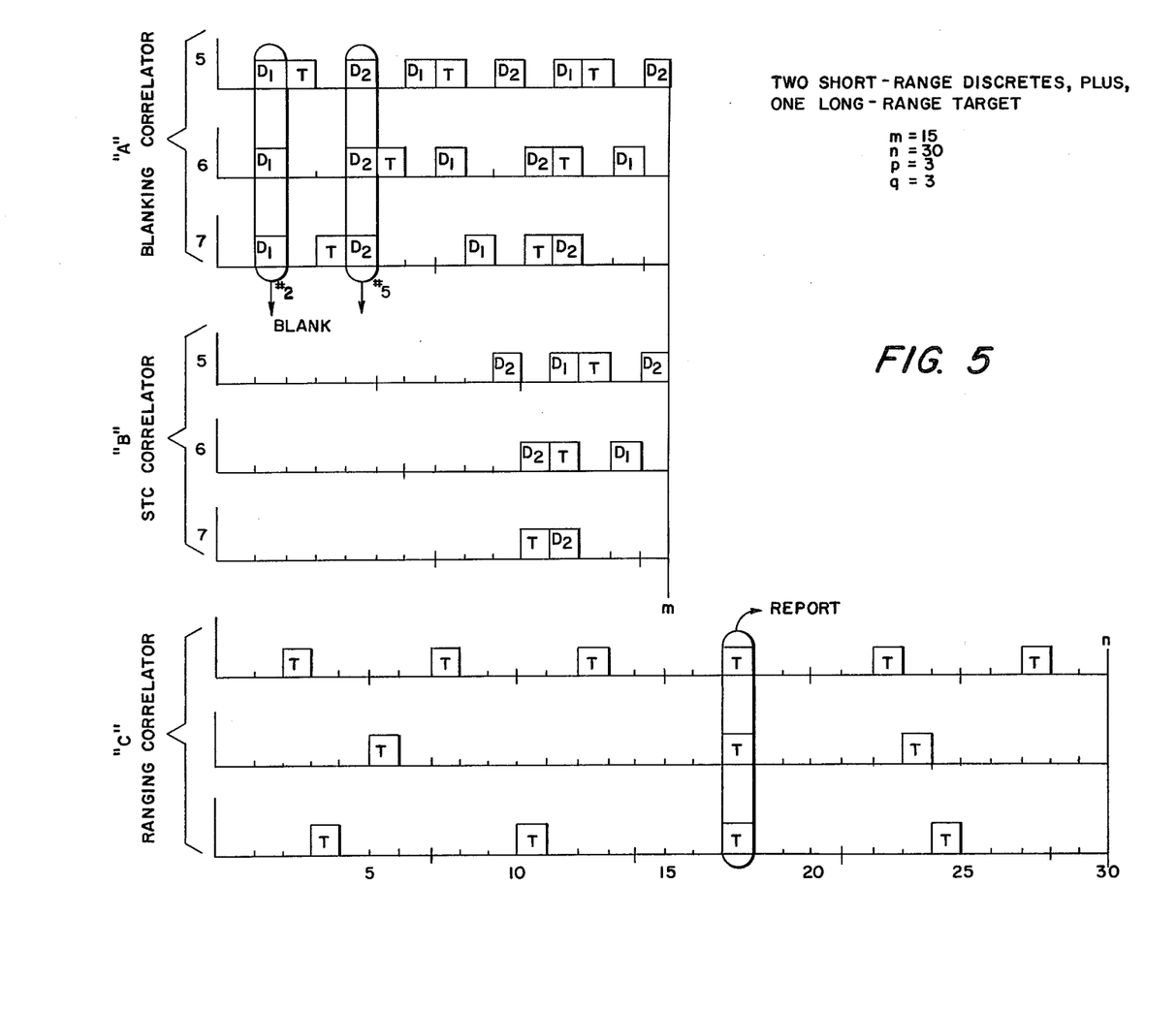
FIG. 5 is a graphic representation of the data being processed by the system of the present invention shown in FIG. 4.

For each ambiguous PRF signal, corresponding to a particular PRF which is provided to the range unfolder 39, an unfolded range signal is provided for detecting discrete sidelobe clutter returns contained in the unfolded range signal. The output of range unfolder 39 is fed in parallel to A and B correlators which, together with the range unfolder 39, STC function generator 22, STC threshold comparator 27, and comparator 42, comprise a means for detecting the occurrence of discrete sidelobe clutter returns in the STC range signal of the range unfolder 39. The A correlator directly receives the information from the range unfolder 39 in delay line 36. The delay line 36 is comprised of a shift register memory with an address for each range cell and each unambiguous PRF range signal. The delay line 36 has a dimensional capacity of 1 amplitude bit by $m$ range cells by "$q$" PRF's. One amplitude bit indicates the state of the signals fed into the delay line 36 wherein "0" indicates no detection and a "1" indicates a signal detection. The number of range cells $m$ in the delay line 36 corresponds to the number of range cells within the maximum range of the STC threshold function employed in the B correlator. The $q$ PRF's may be three or more, and are typically 6 to 8 in number. For illustration purposes, $q$ is indicated in FIG. 5 as 3.

Simultaneously, the data output from the range unfolder 39 is fed to a STC threshold circuit 24, controlled by the STC function generator 22 which follows an $R^{-4}$ power curve identical to that shown and described with respect to FIGS. 2 and 3. The STC threshold circuit 24 compares the unfolded, unambiguous range signal of each PRF with the STC level which follows an $R^{-4}$ power curve to determine whether a signal occurring in a particular range cell of the unfolded range signal represents a discrete sidelobe clutter return. The STC threshold circuit 24 is comprised of a comparator circuit and the STC function generator 22 includes a range counter, a $\log_2$ range memory, a subtractor, and a $\log_2^{-1}$ range memory. The range counter counts each range cell of the STC range and, for each range cell, accesses an address in the $\log_2$ range memory. The $\log_2$ range memory, which is comprised of a read-only memory, provides an output which is the log $_2$ value of a predetermined function of range. The range function represents the STC threshold level and is determined from empirical data, and, for the preferred embodiment, is a factor of the fourth power of the STC range. From each output of the $\log_2$ range memory which represents a range cell counted by the range counter, the subtractor subtracts a value, the magnitude of which is controllably varied by processing unit (not shown) to provide a reference for the STC threshold level. Although the presently-disclosed invention would function equally well if the value subtracted by the subtractor were constant, this value is made controllably variable in the preferred embodiment to afford flexibility in the range over which the STC threshold level is to be compared to the unfolded PRF range signals. The preferred embodiment of the radar receiver is thereby made available for a plurality of operation modes. For example, the radar receiver is made available in track as well as search modes. The output of the subtractor is provided to the $\log_2^{-1}$ range memory, which also is comprised of a read-only memory. The $\log_2^{-1}$ range memory serves the inverse function of the $\log_2$ range memory and converts the $\log_2$ range output of the subtractor into the STC threshold level which is a fourth power function of the STC range. The STC threshold level provided by the $\log_2^{-1}$ range memory is compared in the STC threshold circuit 24 with the unfolded, unambiguous range signal provided by the range unfolder 39. The data exceeding the STC threshold is passed to the delay line 46 of the B correlator.

The delay line 46 of the B correlator is identical to the delay line 36 of the A correlator. The correlation logic circuits 38 and 48 respectively correlate the data in the corresponding $m$ range cells in the delay lines 36 and 46.

The correlation logic circuits 38 and 48 each include a summing network and a comparator such that the summing network adds the output provided by the shift register memory of the delay lines 36 and 46 respectively for each range cell and provides a signal representing the summation to the comparator. When the comparator determines that the signal provided by the summing network exceeds a predetermined value which would indicate correlation among a sufficient number of the unambiguous range signals in a particular range cell, the comparator determines that there is correlation between concurrently accessed addresses representing range cells in each of the unambiguous PRF range signals and provides a correlation signal to the logic circuit 42 which signal is a "1" if there is correlation, and "0" if there is not. The output of the A correlator is compared with the output of the B correlator for each of the $m$ unambiguous range cells. Logic circuit 42, which is comprised of an inverter on the "A" input and an inverting NAND gate, produces a range cell number indication whenever the A correlator produces a signal of "1" and the B correlator produces a signal of "0" for any particular unambiguous range cell.

A range folder 49 converts the true range cell number (corresponding to an identified clutter discrete) into a form suitable to control the data blanker 33. This is accomplished by a divider circuit which divides the true range cell number by the number of gates per interpulse period (for each PRF, in turn) and outputting the remainder or "modulo". That is, the range folder 49 folds the output of the comparator, or logic circuit 42, into a predetermined number of range cells, in accordance with the interpulse period of the respective PRF, to provide an ambiguous PRF discrete signal to the data blanker 33. This corresponds to the inverse operation of the range unfolder 39. The folding means, i.e. the range folder 49, includes a random access memory and a modulo range counter for each PRF of the radar. The random access memory provides a memory address for each range cell of each unambiguous PRF discrete signal and the addresses associated with each unambiguous PRF discrete signal are successively accessed by the modulo range counter associated with the corresponding unambiguous PRF range signal to store the ambiguous PRF discrete signals in the random access memory.

The ambiguous range gate number is then employed to blank out data received in the data blanker 33, which includes an inverter and an "AND" gate from the detection buffer 31 in that corresponding ambiguous range cell number. The buffer 41 receives the data from the data blanker 33 for each ambiguous range cell, except those which are blanked. The information is then fed to a means for determining the range of the target from the target returns provided by the data blanker which means includes the C correlator and a range unfolder 29 which assigns the data from the buffer 41 to unambiguous range cells for each PRF. The range unfolder 29 is similar to the range unfolder 39 and performs the same unfolding operation on the ambiguous PRF signals received from the second buffer 41 as the range unfolder 39 performs on the ambiguous PRF signals received from the detection buffer 31. The C correlator, which includes a delay line 26 comprised of a shift register memory and a correlation logic circuit 28 comprised of a summing network and a comparator corresponds to the correlator section shown in FIG. 2, and has a dimension of 1 amplitude bit by "$n$" range cells by "$q$" PRF's. The correlation logic 28 then determines the number of occurrences "$p$" in corresponding range cells of the "$q$" PRF's. Typically, $p$ is 3 and may be increased in areas of heavy discrete sidelobe clutter. However, an increase in $p$ is necessarily met with a lower degree of sensitivity to the true target, since a large number of correlations are necessary in order to indicate a true target return.

With reference to FIG. 5, which indicates the presence of two short range discrete return signals $D_1$ and $D_2$, and one long-range target return signal T, the operation of the present invention is described. For illustration purposes "$q$" equals 3, "$m$" equals 15, "$n$" equals 30 and "$p$" equals 3. Furthermore, for illustration and direct comparison with the system described above with respect to FIG. 3, the three PRF's are indicated to have range cells of 5, 6 and 7 between their respective transmitted pulses ($PRF_5$, $PRF_6$ and $PRF_7$).

In $PRF_5$, discrete sidelobe return signal $D_1$ occurs in unambiguous range cells 2, 7, 12, . . . , etc; true target return signal T occurs in unambiguous range cells 3, 8, 13, . . . , etc.; and discrete sidelobe return signal $D_2$ occurs in unambiguous range cells 5, 10, 15, . . . , etc.

In $PRF_6$, discrete sidelobe return signal $D_1$ occurs in unambiguous range cells 2, 8, 14, . . . , etc; true target return signal T occurs in unambiguous range cells 6, 12, . . . , etc.; and discrete sidelobe return signal $D_2$ occurs in range cells 5, 11, . . . , etc.

In $PRF_7$, discrete sidelobe return signal $D_1$ occurs in range cells 2, 9, . . . , etc.; true target return signal T occurs in range cells 4, 11, . . . , etc.; and discrete return signal $D_2$ occurs in range cells 5, 12, . . . , etc.

On a range cell by range cell basis, the A correlator indicates outputs of "1" in unambiguous range cells 2, 5 and 12. The same data is applied in parallel through the B correlator, using the STC threshold function as indicated in FIG. 3, producing an output signal in range cell 12 only. In the prior art system, an output in range cell 12 would be equivalent to a ghost signal. However, the present invention provides for removal of ghost signals. Since A correlator produces a "1" in range cells 2, 5 and 12 and B correlator produces a "0" in range cells 2 and 5, the logic circuit 42 indicates that range cells numbers 2 and 5 contain sidelobe discrete return signals and should be blanked in the incoming data to the "C" correlator. The information indicating range cell numbers 2 and 5 is fed to the range folder 49. The range folder circuit 49 provides ambiguous range gates for each of the PRF's, wherein ambiguous range cells 2 and 5 are designated to be blanked. The unambiguous range cell 12 which contained a correlated ghost signal is blanked by the above operations. By blanking ambiguous range cells 2 and 5, in the data blanker 33, unambiguous range cell 12 will not produce a correlation in the C correlator, since it corresponds to ambiguous range cell 2 in $PRF_5$ and ambiguous range cell 5 in $PRF_7$. Extended over the reception range of the system, correlation will not occur in the C correlator in unambiguous range cells 2, 5, 12, 23 or 30, as was possible in the prior art system shown in FIGS. 2 and 3.

In the example, the output of the C correlator will indicate only a correlation of the true target return signals as they occur in corresponding unambiguous range cell No. 18 of each PRF, thereby indicating the unambiguous range of true target in the direction of the main beam.

In summary, the improved post detection-STC system of the present invention is intended to be used in a single channel medium PRF pulse doppler type radar system using a conventional directional antenna. It is evident that the improved system of the present invention, is effective for eliminating ghost targets by using a minimum of hardware, and thereby significantly reduces fabrication and maintenance costs.

It will be apparent that many modifications and variations may be effected without departing from the scope of the novel concept of this invention. Therefore, it is intended by the appended claims to cover all such modifications and variations which fall within the true spirit and scope of the invention.

What is claimed is:

1. A single channel radar receiver responsive to return signals that include discrete sidelobe return signals and target return signals, said receiver comprising:
    first means for correlating said return signals to provide a first correlation signal;
    means for thresholding the return signals over a predetermined period of time to provide thresholded return signals;
    second means for correlating the thresholded return signals in response to the output of the thresholding means to provide a second correlation signal;
    means for detecting discrete sidelobe clutter returns in response to said first and second correlation signals to provide a blanking signal;
    means for blanking the discrete sidelobe return signals of said return signals in response to the blanking signal to provide target return signals; and
    means for determining the range of the target return signals in response to the target return signals of said blanking means.

2. A method of processing return signal data in a medium PRF radar receiver, to distinguish main beam true target return signals from sidelobe return signals over multiple transmitted PRF's, comprising the steps of:
    correlating said return signal data over a first predetermined number of unambiguous range cells for each PRF, to produce a first signal for each range cell indicative of a second predetermined number of corresponding range cells being occupied by return signal data;
    thresholding said return signal data over a predetermined time period corresponding to a predetermined range for each PRF, wherein the threshold level varies over said predetermined time period;
    correlating said thresholded returned signal data over said first predetermined number of unambiguous range cells for each PRF, to produce a second signal for each range cell indicative of said second predetermined number of corresponding range cells being occupied by said thresholded returned signal data;
    comparing said first and second signals to determine the range cell number in which a first signal is present and a second signal is not present;
    blanking said determined range cell number in said return signal data for each PRF to remove any said sidelobe return signals present in said return signal data; and
    correlating said blanked return signal data over a third predetermined number of unambiguous range cells for each PRF to produce a third signal indicative of the unambiguous range of any main beam true target return signals present in said return signal data.

3. A method as in claim 2, wherein said steps of correlating to produce respective first and second signals, occur simultaneously.

4. A method as in claim 2, wherein said steps of correlating said return signal data and correlating said thresholded return signal data takes place prior to said steps of correlating said blanked return signal data.

5. A method as in claim 2, wherein said steps of correlating said return signal data and correlating said thresholded return signal data over a first predetermined number of unambiguous range cells is less than said third predetermined number of unambiguous range cells over which said step of correlating said blanked return signal data is performed.

6. A system for processing return signal data in a medium PRF radar receiver to distinguish main beam true target return signals from sidelobe return signals over multiple transmitted PRF's comprising:
    first means for correlating said return signal data over a first predetermined number of unambiguous range cells for each PRF to produce a first signal for each range cell indicative of a second predetermined number of corresponding range cells being occupied by return signal data;
    means for thresholding said return signal data over a predetermined time period of each PRF, wherein the threshold level varies over said predetermined time period;
    means for correlating said thresholded return signal data over said first predetermined number of unambiguous range cells for each PRF, to produce a second signal for each range cell indicative of said second predetermined number of corresponding range cells being occupied by said thresholded return signal data;
    means for comparing said first and second signals and producing a third signal according to the range cell number in which a said first signal is present and a said second signal is not present;
    means for receiving said third signal and blanking said corresponding range cell number in said return signal data for each PRF to remove said sidelobe return signals present in said return signal data; and
    means for correlating said blanked return signal data over a third predetermined number of unambiguous range cells for each PRF and producing a fourth signal indicative of the unambiguous range for any true target return signals present in said returned signal data.

7. A system for processing return signal data as in claim 6, wherein said means for thresholding said return signal data includes means for generating a threshold level which varies as a function of an $R^4$ power curve decaying over said first predetermined number of unambiguous range cells for each PRF.

8. A system for processing return signal data as in claim 6, including means for unfolding said return signal data in unambiguous range cells, for each PRF, and outputting said return signal data into said respective return signal data correlating means and said return signal data thresholding means.

9. A system for processing return signal data as in claim 6, wherein said return signal data correlating means comprises a delay line for receiving said return signal data in a first predetermined number of unambiguous range cells, for each PRF, and correlation logic circuitry for producing a said first signal for each range cell indicative of said second predetermined number of corresponding range cells being occupied by return signal data.

10. A system for processing return signal data as in claim 6, wherein said thresholded return signal data correlating means includes a delay line for receiving said thresholded return signal data in said first predetermined number of unambiguous range cells, for each PRF, and correlation logic circuitry for producing a said second signal for each range cell indicative of said second predetermined number of corresponding range cells being occupied by thresholded return signal data.

11. A system for post-detection processing of return signal data over multiple PRF's subsequent to the removal therefrom of main beam clutter return signal data in a single channel medium PRF pulse doppler type radar receiver, comprising:
  means for temporarily storing said return signal data for each of a plurality of ambiguous range cells in each PRF;
  means for unfolding said data from said temporary storage means into unambiguous range cells for each PRF;
  means for correlating said unfolded data to determine at least a predetermined number of occurrences of data in corresponding unambiguous range cells of said multiple PRF's and producing a first output signal for each correlated range cell indicating said determination;
  means for amplitude thresholding said unfolded data along a predetermined decaying threshold corresponding to a first predetermined number of unambiguous range cells, for each PRF, and outputting said unfolded thresholded data;
  means for correlating said thresholded data over said first predetermined number of unambiguous range cells to determine at least said predetermined number of occurrences of thresholded data in corresponding unambiguous range cells of said multiple PRF's and producing a second output signal for each correlated cell indicating said determination;
  means for comparing said first and second output signals for each correlated cell and outputting a third signal, when said first signal indicates at least said predetermined number of occurrences and said second signal indicates less than said predetermined number of occurrences, indicating said compared range cell number;
  means for converting said third signal to an ambiguous range cell gate and blanking said corresponding ambiguous range cell in said data from said temporary storage means for each PRF;
  means for unfolding said data from said blanking means into unambiguous range cells for each PRF; and
  means for correlating said unfolded data from said blanking means over a second predetermined number of unambiguous range cells to determine at least said predetermined number of occurrences of data in corresponding unambiguous range cells of said multiple PRF's and producing a fourth output signal for each unambiguous range cell in which said data is determined to occur at least said predetermined number of times in said corresponding unambiguous range cells of said multiple PRF's, thereby indicating the unambiguous range of true target return signals as distinguished from all other return signals in said return signal data.

12. A pulse doppler radar receiver for detecting the range of a target from received signals which include target returns, main beam clutter returns, area sidelobe clutter returns and discrete sidelobe clutter returns, said receiver comprising:
  means for filtering the main beam clutter returns from said received signals;
  means for providing an adaptive threshold signal which varies in response to the amplitude of the area sidelobe clutter returns said providing means being responsive to said filtering means to remove said area sidelobe clutter returns from said received signals;
  means for unfolding the output of said providing means over a predetermined range, said unfolding means being responsive to the output of said providing means to provide an unambiguous range signal;
  means for thresholding the unambiguous range signal in response to the output of said unfolding means, the threshold being such that the discrete sidelobe clutter returns are rejected over a selected range of said unambiguous range signal;
  means for detecting discrete sidelobe clutter returns in the unambiguous range signal of said unfolding means said detecting means being responsive to said unfolding means and to said thresholding means to provide a blanking signal;
  means for blanking the discrete sidelobe clutter returns detected by said detecting means from the output of said providing means, said blanking means being responsive to said detecting means to provide the target returns of the received signals; and
  means for determining the range of the target in response to said target returns provided by said blanking means.

13. The apparatus of claim 12 wherein said detecting means includes:
  means for folding the discrete sidelobe clutter returns detected by said detecting means into a predetermined range, such that said detecting means provides an ambiguous pulse repetition frequency discrete signal to said blanking means.

14. A pulse doppler radar receiver for detecting the range of a target from received signals which include target returns, main beam clutter returns, area sidelobe clutter returns and discrete sidelobe clutter returns, said receiver comprising:
  means for filtering the main beam clutter returns from said received signals;
  means for providing a threshold signal which varies in response to the area sidelobe clutter returns, said providing means being responsive to said filtering means to remove said area sidelobe clutter returns from said received signals;
  means for unfolding the output of said providing means over a predetermined range said unfolding means being responsive to the output of said providing means to provide an unambiguous range signal;
  first means for comparing the unambiguous range signal of said unfolding means to a sensitivity time control threshold signal, said comparing means being responsive to the unambiguous range signal and to the sensitivity time control threshold signal to detect target returns in the unambiguous range signal;

first means for correlating the target returns and discrete sidelobe clutter returns of at least two unambiguous range signals in response to the output of said unfolding means;

second means for correlating the target returns detected by said first comparing means in at least two unambiguous range signals in response to the output of said first comparing means;

second means for comparing the correlations of said first and second correlating means, said second correlating means being responsive to the outputs of said first and second correlating means to detect discrete sidelobe clutter returns in the unambiguous range signals of said unfolding means;

means for blanking the discrete sidelobe clutter returns detected by said second comparing means from the output of said providing means, said blanking means being response to said second comparing means and to the output of said providing means to provide the target returns of said received signals; and means for determining the range of the target in response to the target returns provided by said blanking means.

15. The apparatus of claim 14 wherein said second comparing means includes:

means for folding the discrete sidelobe clutter returns detected by said second comparing means into a predetermined range, such that an ambiguous pulse repetition frequency discrete signal is provided to said blanking means.

* * * * *